Jan. 20, 1959
R. ZUKOR
2,869,621
ADJUSTABLE HEADREST FOR TRAIN SEATS AND THE LIKE
Filed Nov. 5, 1956
2 Sheets-Sheet 1
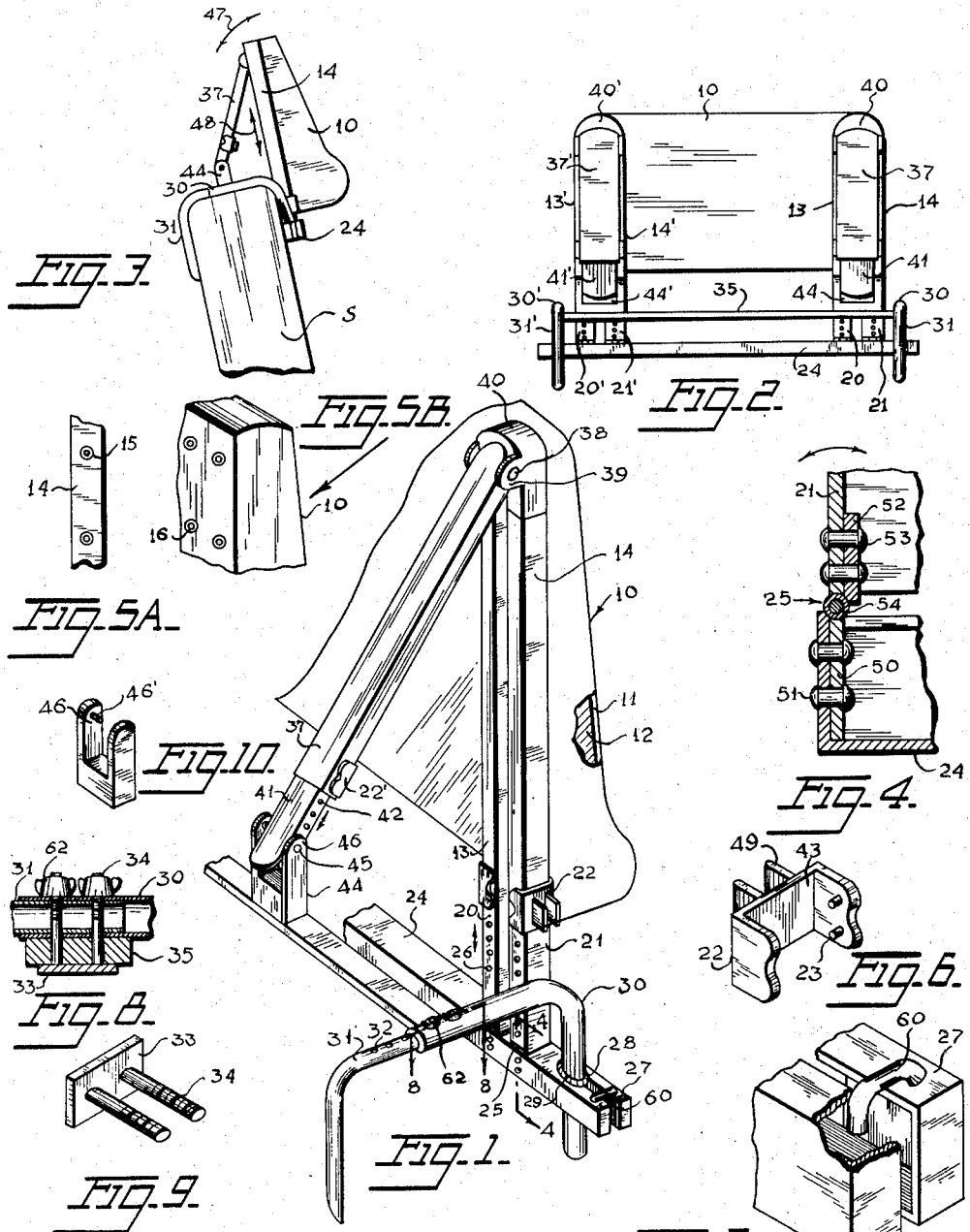
INVENTOR.
RAYMOND ZUKOR
BY
ATTORNEY Jan. 20, 1959 R. ZUKOR 2,869,621
ADJUSTABLE HEADREST FOR TRAIN SEATS AND THE LIKE
Filed Nov. 5, 1956 2 Sheets-Sheet 2
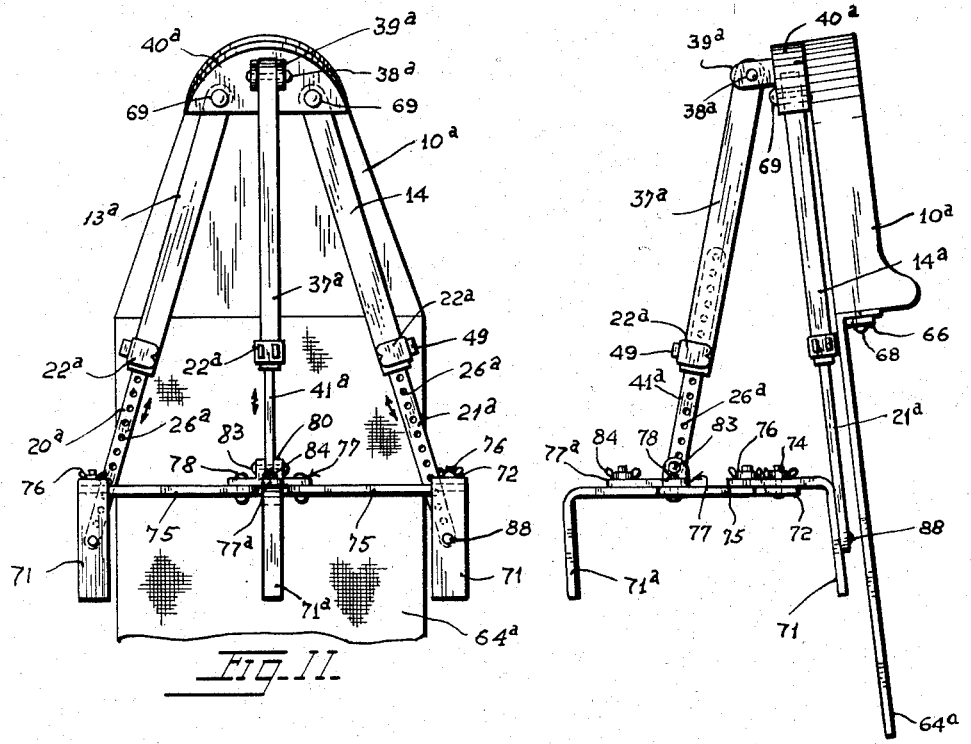
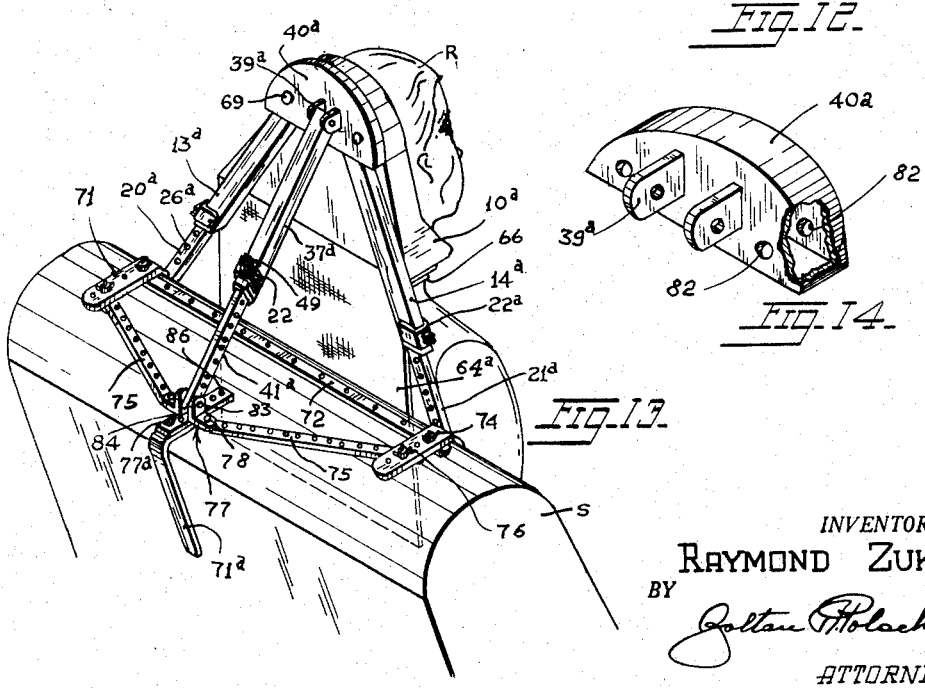
INVENTOR.
RAYMOND ZUKOR
BY
ATTORNEY

United States Patent Office 2,869,621
Patented Jan. 20, 1959

2,869,621

ADJUSTABLE HEADREST FOR TRAIN SEATS AND THE LIKE

Raymond Zukor, New York, N. Y.

Application November 5, 1956, Serial No. 620,340

7 Claims. (Cl. 155—177)

This invention concerns a headrest for a seat and particularly concerns an adjustably positionable headrest which is removable and portable.

It is a principal object of the invention to provide a headrest device which may be affixed to a seat of a train, automobile, and the like.

It is a further object to provide a headrest which is adjustably positionable both vertically and pivotally with respect to a seat.

It is a further object to provide a headrest which is readily attachable and removable from a seat, and is easily adjusted both vertically and pivotally with respect to the back of the seat.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a portion of a headrest device embodying the invention, parts being broken away.

Fig. 2 is a rear elevational view of the device.

Fig. 3 is a side elevational view of the device mounted on a seat.

Fig. 4 is an enlarged sectional view taken on lines 4—4 of Fig. 1 showing details of construction of the device.

Fig. 5A is a front view of a portion of a leg support for a pillow.

Fig. 5B is a perspective view of a portion of a pillow.

Fig. 6 is a perspective view of a clip for adjusting the length of a leg of the device.

Fig. 7 is a perspective view of a bar clamping device, parts being broken away.

Fig. 8 is a sectional view taken on line 8—8 of Fig. 1.

Fig. 9 is a perspective view of a bar clip.

Fig. 10 is a perspective view of an alternate form of bracket for pivoting a leg of the device.

Fig. 11 is a rear elevational view of another form of the invention.

Fig. 12 is a side elevational view thereof.

Fig. 13 is a perspective view thereof shown applied to a seat.

Fig. 14 is a fragmentary detail perspective view of the shell joining the top of the leg portions of the headrest, parts being broken away.

The headrest device shown in Figs. 1, 2 and 3 includes a rectangular pillow 10 made of a resilient pad 12 containing foam rubber, expanded plastic or the like. The pad is enclosed in a suitable cover 11 of cloth, plastic, or other suitable upholstery cover fabric. The pillow is removably attached to a pair of legs 13, 14 by snap fasteners. The mating parts 15, 16 of the snap fasteners are best shown in Figs. 5A and 5B.

Legs 13 and 14 are hollow rectangular shells in which are adjustably positionable the rectangular cores 20, 21. Clips 22 of flexible material having pegs or prongs 23 best shown in Fig. 6 are provided to secure the cores in desired positions in the legs 13, 14. A pair of holes are located near the lower end of each leg to receive the pegs 23. The cores are pivotally mounted on a hollow bar 24 by a hinge 25 best shown in Fig. 4. These cores have holes 26 disposed at equal intervals along the sides thereof. The pegs 23 pass through the holes (not shown) in legs 13, 14 and through holes 26. These pegs serve to permit adjustment of the positions of the cores as well as to hold the legs and associated cores in alignment.

The bar 24 has bifurcated ends 27. Adjoining portions of each end 27 are spaced apart to define a passage which terminates in a wide aperture 28. In this aperture is disposed one end of a curved hollow bar 30. A resilient collar or sleeve 29 surrounds the bar 30 in the aperture 28. In bar 30 is a core 31. This core has a plurality of holes 32 disposed along its length. The core is adjustably positionable in bar 30 and is secured in position by a double-pronged clip 33 best shown in Figs. 8 and 9. The bar 30 is provided with a pair of apertures through which pass the prongs 34 of clip 33. A flat bar 35 joins the bars 30, 30'.

A third leg 37 which is also a hollow shell member is pivotally attached to the legs 13, 14. The leg 37 pivots on pintle 38 mounted in extensions 39 of a U-shaped shell 40 which fits over the ends of legs 13, 14. A core 41 is movably adjustable in leg 37. This core has apertures 42 to receive the pegs or prongs of a clip 22' constructed like the clip 22. A pair of apertures (not shown) are located near the lower end of leg 37 through which pass the prongs of the clip into the apertures 42. The lower end of core 41 is pivotally mounted in a bracket 44 and pivots on a pintle 45 secured in the extended portions 46 of the bracket. Brackets 44 and 44' are mounted near the ends of the flat bar 35. If desired the extended portions 46 may be flexible and have attached prongs 46' so that use of a separate pintle 45 may be omitted as shown in Fig. 10.

In Fig. 2 is shown the pillow 10 supported by legs 13, 14 and 13', 14' which are pivotally attached to the bar 24. Brackets 44, 44' pivotally support the cores 41, 41' which are secured in the legs 37, 37'. Legs 37, 37' are pivotally attached to the brackets 40, 40'. The clasp bars or cores 31, 31' are secured in the hollow curved clasp bars 30, 30' mounted in crossbar 24.

In Fig. 3 is shown how the headrest is mounted on the back or upright portion S of a seat. The headrest is adjustable pivotally as indicated by arrow 47 and vertically or radially as indicated by arrow 48. The members 30, 31 and 30', 31' form clasps which anchor the headrest on the top of the seat. Bar 35 rests firmly on the top of the seat and bar 24 rests in the front of the seat. To adjust the position of the headrest pivotally, clip 22' is removed. This is done by pressing inwardly on the extensions 49 of the flexible body of the clip. The body thus bends outwardly to withdraw the pegs 23 from apertures 42. By moving the core 41 inwardly or outwardly of the leg 37 the angular position of the pillow is adjusted. During this adjustment the leg 37 pivots in bracket members 39 and core 41 pivots in bracket 44. When clip 22' is replaced the pivotal adjustment of the headrest is completed. By removing clips 22 the positions of cores 20, 21 in legs 13, 14 may be adjusted. The clips will then be replaced to secure the cores in the desired positions. Similar adjustments will, of course, be made with the legs 13', 14', 37' and cores 20', 21' and 41'.

In Fig. 4 is shown the arrangement of the hinge 25 which has a tubular portion integral with the plate portion 50. A pair of rivets 51 secure the plate to the hollow bar 24. Another plate portion 52 of the hinge is secured by rivets 53 to the core 21. Both plates have integrally formed tubular portions which rotate with respect to each other on the pintle 54.

In Fig. 5A are shown the fastener elements 15 which may be male or female parts of snap fasteners. These elements are attached in a suitable manner to the front sides of legs 13, 13', 14, 14' in registering positions with corresponding mating fasteners 16 arranged in double rows on the back of pillow 10 as shown in Fig. 5B. By this arrangement the pillow is securely mounted and yet is readily detached from the headrest.

In Fig. 6 is shown the generally U-shaped clip 22 which has a pair of finger grips or extensions 49 on the exterior of its flexible center portion 43. The extensions are small leaves disposed perpendicular to the face of the center plate portion 43. On each lateral portion of the U is a pair of prongs or pegs 23. When the leaves 49 are pressed together by hand the sides of the clip spread outwardly so that the space between the aligned prongs on the opposing sides of the clip increases.

In Fig. 7 is shown a U-shaped clip 60 which is anchored in apertures in the spaced end sections 27 of bar 24. This clip serves to draw the sections 27 together to clamp the bar 30 and collar 29 securely to bar 24.

In Figs. 8 and 9 is shown the clip 33 which is a rectangular plate having a pair of threaded prongs 34. These prongs pass through apertures in bar 35, as well as the telescoped bars 30 and 31. Nuts 62 which may be wing nuts secure the entire assembly of bars and clip together.

Referring now to the form of the invention shown in Figs. 11 to 14, inclusive, the headrest shown therein comprises a pillow 10$^a$ which is generally triangular in form. The pillow has a depending apron extension 64 which hangs down on the seat S and is disposed at the back of a rider R in the vehicle. A plate 66 and rivets 68 secure the flexible cloth or plastic apron to the pillow cover. Pillow 10$^a$ is secured to the arcuate shell 40$^a$. Shell 40$^a$ fits over the ends of the hollow shell legs 13$^a$, 14$^a$. These legs are disposed in an outwardly flared arrangement. They are pivotally fastened to pivot pins 69 extending through openings 82 in the opposing shell walls and registering openings in the top ends of the legs. A third leg 37$^a$ which is also a hollow shell member is pivotally attached to bracket lugs 39$^a$ on the rear wall of shell 40$^a$ by pin 38$^a$. Cores 20$^a$, 21$^a$ and 41$^a$, are slidably movable in the legs 13$^a$, 14$^a$ and 37$^a$ respectively. The core members are provided with spaced holes 26$^a$ therealong arranged for receiving the projecting pins of the removable clips 22$^a$. These clips hold the legs and cores in adjusted and aligned positions. The outer ends of core members 20$^a$ and 21$^a$ terminate on and are pivotally secured to the front sides of the two L-shaped seat brackets 71 by pins 88. The top portions of the seat brackets 71 overlie the top of the seat and are joined by the perforated crosspiece or crossbar 72. Wing nuts and bolts 74 permit adjustably spacing the brackets 71. Perforated bars or braces 75 are obliquely disposed and are adjustably joined to brackets 71 by wing nuts and bolts 76. Bars 75 are pivotally attached to bracket plate 77 by pins 78 on the top of seat S. Plate 77 has upstanding lugs 80 in which the lower end of core member 41$^a$ terminates. Pin 83 permits pivotal movement of the end of core member 41$^a$.

A third L-shaped bracket bar on plate 71$^a$ is secured to extension lug 77$^a$ of plate 77 by a wing nut and bolt 84 passing through one of apertures 86 in the top portion of bracket 71$^a$. This top portion overlies the top of seat S at the rear thereof and depends down along the rear side of the seat in snug engagement therewith.

In using the headrest of Figs. 11–14, brackets 71, 71$^a$ are hooked over the front and back respectively of seats and the several wing nuts 74, 76, 84 are tightened after bracket 77 is set at the desired position and brackets 71 are spaced the desired distance apart. Clips 22$^a$ are removed and then replaced when core members 20$^a$, 21$^a$, and 41$^a$ have been adjusted in tripod legs 13$^a$, 14$^a$, 37$^a$ to set the headrest at the required height. The flexible apron extension 64$^a$ of pillow 10$^a$ serves to insure that the headrest cannot be tipped over backward when the rider leans firmly back on the pillow, since the back and shoulders of the rider R press against the apron 64$^a$.

It is desirable that the several legs, cores and bars be formed of a light metal such as aluminum or magnesium so that the headrest may be easily transported. The headrest collapses to a relatively small size and can be set up and adjusted on a seat in a few minutes without use of any tools.

While I have illustrated and described the preferred embodiments of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A headrest comprising a resilient pillow, said pillow being secured to a first hollow leg by a plurality of snap fasteners, a first core adjustably positionable in said leg and securable by a clip having a pair of protruding pegs, another hollow leg pivotally attached to a bracket secured to the first leg, another core adjustably positionable in said other leg and securable thereto by another clip having a pair of protruding pegs, said cores being pivotally attached at outer ends thereof to a pair of transversely disposed bars, a curved hollow clasp member adjustably positionable in a collar mounted in an aperture in one of said bars near the end thereof, said end being split into two spaced sections connected by clip means, said clasp member having one end secured to the other of said bars, and a curved core member adjustably secured in said clasp member by a pronged member attached to the end of said clasp member and said other bar.

2. A headrest comprising a pillow, a pair of hollow legs supporting said pillow, a first pair of cores adjustably positionable in said legs, another hollow leg pivotally attached to said legs, another core adjustably positionable in said other leg, each of the cores being pivotally attached to a pair of transversely disposed bars, a curved hollow clasp member adjustably positionable in one of said bars and secured to the other of said bars, and a curved core member adjustably secured in said clasp member.

3. An adjustable headrest attachable to a seat in a vehicle or the like, comprising a resilient pillow, a pair of supports for said pillow, each of said supports comprising three hollow legs, two of said legs being attached to said pillow, and the third of said legs being pivotally attached to said two legs, a core adjustably positionable in each of said legs, the cores in said two legs being pivotally attached to a first hollow bar, the core in said third leg being pivotally attached to another bar, and a pair of seat clasps secured to said bars, each of said clasps including a hollow curved member and a curved core member adjustably positionable in said hollow curved member.

4. An adjustable headrest according to claim 3, wherein each of said legs is a substantially rectangular metal bar, said cores being rectangular members with laterally disposed apertures for engagement by prongs of mounting clips.

5. An adjustable headrest according to claim 4, wherein each of said clips is a generally U-shaped plate having a pair of extensions on a flexible center portion perpendicularly disposed thereto, and having a pair of prongs on the inner side of each lateral portion of the U.

6. An adjustable headrest according to claim 3, wherein said hollow curved member is disposed in an aperture in one end of said first bar, said one end being bifurcated and having its sections drawn together by a U-shaped clip.

7. An adjustable headrest according to claim 3, wherein said curved core member is secured to one end of said other bar and to one end of said hollow curved member by a double pronged attachment member.

References Cited in the file of this patent

UNITED STATES PATENTS

| | | |
|---|---|---|
| 1,480,930 | Bullard | Jan. 15, 1924 |
| 2,492,383 | Jones | Dec. 27, 1949 |
| 2,642,124 | Slowey | June 16, 1953 |

FOREIGN PATENTS

| | | |
|---|---|---|
| 316,477 | Germany | Nov. 28, 1919 |